US009296653B2

(12) United States Patent  
Kim-Habermehl et al.

(10) Patent No.: US 9,296,653 B2  
(45) Date of Patent: Mar. 29, 2016

(54) DRY MIX FORMULATIONS CONTAINING CARBOXYLATED STYRENE-BUTADIENE REDISPERSIBLE POLYMER POWDERS AND ALUMINA RICH CONTAINING CEMENTS

(75) Inventors: Linda Kim-Habermehl, Midland, MI (US); Liang Hong, Midland, MI (US); Sean M. Keenan, Midland, MI (US); Juergen Dombrowski, Halle (DE); Hartmut Kuehn, Halle (DE); Margarita Perello, Duebendorf (CH); Sonja Scharlemann, Wedemark (DE); Chengbin Dong, Shanghai (CN); Liang Zhang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/365,160

(22) PCT Filed: Dec. 15, 2011
(Under 37 CFR 1.47)

(86) PCT No.: PCT/CN2011/084066
§ 371 (c)(1),
(2), (4) Date: Jun. 13, 2014

(87) PCT Pub. No.: WO2013/086722
PCT Pub. Date: Jun. 20, 2013

(65) Prior Publication Data
US 2015/0087751 A1    Mar. 26, 2015

(51) Int. Cl.
| | | |
|---|---|---|
| C04B 16/04 | (2006.01) | |
| C04B 7/02 | (2006.01) | |
| C04B 28/04 | (2006.01) | |
| C04B 28/06 | (2006.01) | |
| C04B 40/06 | (2006.01) | |
| C04B 24/26 | (2006.01) | |
| C04B 111/00 | (2006.01) | |
| C04B 111/27 | (2006.01) | |
| C04B 111/70 | (2006.01) | |
| C04B 103/00 | (2006.01) | |

(52) U.S. Cl.
CPC . *C04B 16/04* (2013.01); *C04B 7/02* (2013.01); *C04B 24/2688* (2013.01); *C04B 28/04* (2013.01); *C04B 28/06* (2013.01); *C04B 28/065* (2013.01); *C04B 40/0608* (2013.01); C04B 2103/0057 (2013.01); C04B 2111/00637 (2013.01); C04B 2111/00672 (2013.01); C04B 2111/27 (2013.01); C04B 2111/70 (2013.01)

(58) Field of Classification Search
CPC ................................ C04B 16/04; C04B 7/02
See application file for complete search history.

(56) References Cited

U.S. PATENT DOCUMENTS

| | | |
|---|---|---|
| 4,916,171 A | 4/1990 | Brown et al. |
| 5,403,894 A | 4/1995 | Tsai et al. |
| 5,519,084 A | 5/1996 | Pak-Harvey et al. |
| 5,606,015 A | 2/1997 | Chiou et al. |
| 5,739,179 A | 4/1998 | Chiou et al. |
| 5,744,540 A | 4/1998 | Baumstark et al. |
| 5,753,036 A | 5/1998 | Hornaman et al. |
| 5,872,189 A | 2/1999 | Bett et al. |
| 6,224,981 B1 | 5/2001 | Richard et al. |
| 6,288,174 B1 | 9/2001 | Ikegami et al. |
| 6,423,805 B1 | 7/2002 | Bacho et al. |
| 6,429,251 B2 | 8/2002 | Mayer et al. |
| 6,617,387 B2 | 9/2003 | Dreher et al. |
| 6,765,072 B1 | 7/2004 | Willimann et al. |
| 6,869,987 B2 | 3/2005 | Mills et al. |
| 7,012,114 B2 | 3/2006 | Bett et al. |
| 7,674,860 B2 | 3/2010 | Willimann et al. |
| 7,744,694 B2 | 6/2010 | Weitzel et al. |
| 7,803,225 B2 | 9/2010 | Zhang et al. |
| 2002/0062006 A1 | 5/2002 | Sandor et al. |
| 2007/0037925 A1 | 2/2007 | Weitzel et al. |
| 2007/0074642 A1 | 4/2007 | Amathieu et al. |
| 2007/0112117 A1 | 5/2007 | Weitzel |
| 2011/0160350 A1 | 6/2011 | Bergman et al. |
| 2011/0257303 A1* | 10/2011 | Moussios et al. ............ 524/5 |
| 2011/0306705 A1* | 12/2011 | Dombrowski et al. ........ 524/5 |

FOREIGN PATENT DOCUMENTS

| | | |
|---|---|---|
| CN | 1951858 A | 4/2007 |
| CN | 101555106 A | 10/2009 |
| CN | 101648797 A | 2/2010 |

(Continued)

OTHER PUBLICATIONS

S. M. Thaker et al., "Synthesis and Spray Drying of Water-Redispersible Polymer," Drying Technology, 28: 2010, pp. 669-676.
Wang et al., "Formation of hydrates of calcium aluminates in cement pastes with different dosages of SBR powder," Construction and Building Materials 25, 2011, pp. 726-741.
Wang et al., "Influence of polymer on cement hydration in SBR-modified cement pastes," Cement and Concrete Research 36, 2006, pp. 1744-1751.
Wang et al., "Physica and mechanical properties of styrene-butadiene rubber emulsion modified cement mortars," Cement and Concrete Research 35, 2005, pp. 900-906.

(Continued)

*Primary Examiner* — Robert Harlan
(74) *Attorney, Agent, or Firm* — Andrew E.C. Merriam

(57) ABSTRACT

Dry mix formulations containing a redispersible polymer powder (RDP) made of a low carboxylation, large particle size water-insoluble film-forming styrene butadiene polymer having at least one ethylenically unsaturated dicarboxylic acid monomer, and a high alumina content cement such as a calcium aluminate cement (CAC) or a calcium sulfoaluminate cement (CSA) provides cement compositions having unexpectedly superior water immersion shear strength and set time for a cement containing tile adhesive (CBTA or CTA), superior adhesion properties in water proofing mortars or mortar applications, and superior flexural and compressive strength in grout applications.

7 Claims, No Drawings

(56) References Cited

FOREIGN PATENT DOCUMENTS

| | | |
|---|---|---|
| CN | 101913827 A | 12/2010 |
| CN | 102140026 A | 8/2011 |
| CN | 102173711 A | 9/2011 |
| DE | 29500747 U1 | 3/1995 |
| EP | 0758658 A2 | 2/1997 |
| EP | 812863 A1 | 12/1997 |
| WO | 9715616 A1 | 5/1997 |

OTHER PUBLICATIONS

Wang et al., "Effect of Styrene—Butadiene Rubber Latex l Powder on the Formation of Cement Hydrates," Journal of the Chinese Ceramic Society, vol. 36, No. 7. Jul. 2008, pp. 912-926.

* cited by examiner

DRY MIX FORMULATIONS CONTAINING CARBOXYLATED STYRENE-BUTADIENE REDISPERSIBLE POLYMER POWDERS AND ALUMINA RICH CONTAINING CEMENTS

The present invention relates to dry mix formulations comprising inorganic hydraulic cement, alumina rich containing cement and water-redispersible polymer powders (RDPs) from styrene-butadiene copolymers having carboxyl groups. In particular, the present invention relates to compositions useful in mortar formulations comprising cement, sand, carboxylated styrene butadiene redispersible powder, and an alumina rich containing cement for cementitious tile adhesive or cement containing tile adhesive (CBTA or CTA) applications, waterproofing mortars or membranes and grout.

CTAs are typically prepared with cement, sand, organic polymers, and cellulose ethers. CTA producers struggle to provide adhesives that meet the water immersion shear strength required by applicators who mix the CTAs and use them on site. In the past, the applicators have added cellulose ether to the CTA mixture to control rheology, water retention, slip resistance and improved workability of the CTA or mortar in use. Others have included polymers, such as superplasticizers and polymer powders in CTA applications to improve workability and the strength of the cured adhesives made therefrom.

U.S. Pat. No. 7,803,225 to Zhang et al discloses a non-efflorescing cementitious mortar composition, free of reactive silica material, in the form of a dry-mortar composition or an aqueous mortar composition, comprising a) from 1% by weight to 10% by weight of ordinary Portland cement (OPC), b) from 1% by weight to 30% by weight of calcium aluminate cement, c) from 1% by weight to 15% by weight of calcium sulfate, d) from 0.5% by weight to 30% by weight of an aqueous polymer dispersion or a water-redispersible polymer powder of polymers based on one or more monomers from the group consisting of vinyl esters, (meth)acrylates, vinyl aromatics, olefins, 1,3-dienes and vinyl halides and, if required, further monomers copolymerizable therewith, the weight percentage of aqueous polymer dispersion based on the weight of solids in the dispersion, wherein the weight percentage of each of components a) b), c), and d) is based on the dry weight of the cementitious mortar composition, and wherein in the cementitious mortar composition, the components a), b), c) and d) are present in a weight ratio of a):b):c):d) of 1 to 1.5:2 to 4:1 to 1.5:2 to 4. To avoid efflorescence, Zhang et al desires to avoid production of calcium hydroxide, or to avoid the need to consume calcium hydroxide which is produced, during Portland cement hydration. Zhang et al seeks to avoid the need to use a reactive silica material or water soluble amino resin which would react with and consume any produced calcium hydroxide. Zhang et al employs a greater amount of expensive high calcium aluminate cement (CAC), which produces no or very little calcium hydroxide, than the lesser expensive ordinary Portland cement (OPC) whose main component is calcium silicate.

The present invention solves the problem of providing a cement containing tile adhesive with improved water immersion shear strength and set time, improved adhesion properties in water proofing membranes or mortar applications, and improved flexural and compressive strength in grout applications, even with a higher amount of ordinary Portland cement than the amount of high calcium aluminate cement thereby also reducing formulation cost.

SUMMARY OF THE INVENTION

In accordance with the present invention, a dry mix cement composition, such as a cement containing tile adhesive (CBTA or CTA), grout, or water proofing membrane or mortar comprises 0% by weight to 50% by weight of an ordinary Portland cement (OPC), based upon the weight of the dry mix composition, a water-redispersible polymer powder (RDP) made from a carboxylated water insoluble film-forming styrene-butadiene polymer, preferably a low carboxylation, large particle size water-insoluble film-forming styrene-butadiene polymer having a weight average particle size of from 150 nm to 500 nm, preferably from 200 nm to 400 nm, more preferably from 220 nm to 350 nm, and an amount of carboxylation of from 0.1% by weight to 2.75% by weight, preferably from 0.5% by weight to 2.5% by weight, more preferably from 1% by weight to 2% by weight of at least one ethylenically unsaturated dicarboxylic acid, salts thereof, or mixtures thereof, based on the weight of the water insoluble film forming polymer, and a high alumina content cement, or alumina rich cement, such as calcium aluminate cement (CAC) or calcium sulfoaluminate cement (CSA). The high alumina content cement, such as calcium aluminate cement has an alumina ($Al_2O_3$) content of greater than 30% by weight, preferably greater than 40% by weight, more preferably greater than 55% by weight, most preferably at least 70% by weight, based upon the weight of the high alumina content cement, such as calcium aluminate cement.

When calcium aluminate cement is employed, such as in a cement based tile adhesive dry mix (CBTA or CTA) or grout dry mix composition, it is used in a low amount of from 0.5% by weight to 8% by weight, based upon the weight of the dry mix composition, and the amount of ordinary Portland cement employed may be at least three times as much, or from 25% by weight to 45% by weight, based upon the weight of the dry mix composition. For a CBTA dry mix composition, the amount of calcium aluminate cement may be from 1% by weight to 8% by weight, preferably from 2.5% by weight to 5.5% by weight, and the amount of ordinary Portland cement may be 25% by weight to 45% by weight, preferably from 30% by weight to 40% by weight, each weight percentage being based upon the weight of the dry mix composition. In a CBTA composition, calcium sulfate is employed with the calcium aluminate cement preferably in an amount of from 40% by weight to 60% by weight, for example 50% by weight of calcium sulfate, based upon the weight of the calcium aluminate cement. For a grout dry mix composition, the amount of calcium aluminate cement may be from 0.5% by weight to 5% by weight, for example 1% by weight to 3% by weight, and the amount of ordinary Portland cement may be 25% by weight to 35% by weight, each weight percentage being based upon the weight of the dry mix composition. Calcium sulfate may be optionally employed in the grout dry mix composition in an amount of from 40% by weight to 60% by weight, for example 50% by weight of calcium sulfate, based upon the weight of the calcium aluminate cement.

When calcium sulfoaluminate cement (CSA) is employed, such as in a water proofing mortar dry mix composition, it is used in an amount of from 30% by weight to 50% by weight of the dry mix composition. The calcium sulfoaluminate cement may be used without any ordinary Portland cement (0% by weight ordinary Portland cement), or it may be used in amounts up to 50% by weight, preferably from 30% by weight to 50% by weight, based upon the total weight of the dry mix composition of the present invention. The calcium sulfoaluminate cement may be employed without the need for any added calcium sulfate.

The compositions of the present invention which contain the styrene butadiene (SB) RDP enable the user to achieve improved water immersion shear strength and set time for a cement containing tile adhesive (CBTA or CTA), improved adhesion properties in water proofing membranes or mortar applications, and improved flexural and compressive strength in grout applications whereas significant improvement in those properties are not achieved with other RDPs such as a vinylacetate ethylene (VAE) copolymer RDP, or a VAE/vinyl acetate—versatic vinylester (VA-VeoVA) copolymer mixture RDP. The amount of the redispersible polymer powder employed may be 0.1% by weight to 10% by weight, with 1% by weight to 6% by weight being preferable for CBTA dry mix compositions, 0.5% by weight to 4% by weight being preferred for grout dry mix compositions, and 1% by weight to 5% by weight being preferred for water proofing mortar dry mix compositions, each of the weight percentages being based upon the weight of the dry mix formulation.

Unless otherwise indicated, all temperature and pressure units are room temperature and standard pressure (STP). All ranges recited are inclusive and combinable.

All phrases comprising parentheses denote either or both of the included parenthetical matter and its absence. For example, the phrase "(methyl)styrene" includes, in the alternative, styrene and methyl styrene.

As used herein, unless otherwise indicated, the phrase "molecular weight" refers to the weight average molecular weight as measured by gel permeation chromatography (GPC) against a poly(styrene) standard. As used herein, the term "polymer" refers, in the alternative, to a polymer made from one or more different monomer, such as a copolymer, a terpolymer, a tetrapolymer, a pentapolymer etc., and may be any of a random, block, graft, sequential or gradient polymer.

As used herein, the term "mortar viscosity" refers to the 5 rpm Brookfield viscosity of a mortar measured at 25° C., as in the examples below.

As used herein, $T_g$ is measured using differential scanning calorimetry or DSC (rate of heating 10° C. per minute, $T_g$ taken at the midpoint of the inflection.)

As used herein, the phrase "wt. %" stands for weight percent.

As used herein, unless otherwise indicated, the phrase "average particle size", refers to the particle diameter or the largest dimension of a particle in a distribution of powder particles as determined by laser light scattering such that 50 wt. % of the particles in the distribution are smaller than the particle and 50 wt. % of the particles in the distribution are larger than the particle. For initial latex dispersion particles, the average particle size was measured via dynamic light scattering using a Nanotrac NPA 150 (Microtrac Inc., York, Pa.) per manufacturer's recommendations. A volume average particle size was recorded. For redispersed particles, the particle size distribution was measured using a Coulter LS 230 particle size analyzer (Beckman Coulter, Brea, Calif.) per manufacturer's recommended Procedures via laser scattering. The scattering light from particles through laser scattering and polarization intensity differential scattering is collected as a function of angle, and subsequently converted to a particle size distribution.

As used herein the term "setting" refers to the solidification of the plastic cement paste. See Concrete—*Microstructure, Properties, & Materials,* 3rd edition, P. Kumar Mehta et al., page 220. The beginning of solidification, called the initial set, marks the point in time when the paste has become unworkable. The paste does not solidify suddenly, but requires considerable time to become fully rigid. The time taken to solidify completely marks the final set.

The present inventors have found that the combination of a RDP made of a carboxylated water-insoluble film forming styrene-butadiene polymer, preferably a low carboxylation, large particle size water-insoluble film-forming styrene butadiene polymer having at least one ethylenically unsaturated dicarboxylic acid monomer, and a high alumina content cement results in the cement composition having unexpectedly superior water immersion shear strength and set time for a cement containing tile adhesive (CBTA or CTA), adhesion properties in water proofing membranes or mortar applications, such as rigid-semi flex mortar formulas, and flexural and compressive strength in grout applications. For example, characterization according to test standard ANSI 118.4 section 5.2.3 (2011) shows that the CTAs formulated with the SB RDPs made of a specific large particle size and low carboxylation polymer and a low amount of calcium aluminate cement compared to the amount of ordinary Portland cement exhibit unexpected superior 7 day water immersion impervious ceramic mosaic shear strength and unexpectedly shorter Vicat set times measured according to test standard ASTM C191 relative to mortars formulated with a vinylacetate ethylene (VAE) redispersible polymer powder. In addition, characterization according to test standard ANSI 118.4 section 5.2.6 (2011) shows that the CTAs in the invention exhibit excellent 28 day impervious ceramic mosaic tile freeze/thaw shear strength. Accordingly, the combination of the large particle size, low carboxylation level water-insoluble film-forming polymer and the reduced amount of calcium aluminate cement relative to the amount of ordinary Portland cement enables excellent water immersion shear strength and freeze/thaw shear strength, and faster setting time of the cement adhesive.

The polymers which may be employed in the present invention are carboxylated water-insoluble film-forming polymers preferably having a low degree of carboxylation and a large average particle size. Preferred water-insoluble film-forming polymers are styrene-butadiene copolymers. In embodiments of the invention, the water-insoluble film-forming polymer may be a large particle size, low carboxylation copolymer comprising the monomers styrene, butadiene, itaconic acid and acrylonitrile.

The water-insoluble film-forming copolymers can be prepared by aqueous emulsion or suspension polymerization, preferably emulsion polymerization, in conventional manner, employing conventional polymerization temperatures, e.g. from 40° C. to 120° C., preferably, 70° C. or more, or, preferably, up to 105° C., and pressures, e.g. with diene comonomer pressures being 150 psi or below, preferably, 100 psi or below. The polymerization may be initiated using conventional amounts of one or more conventional water-soluble or oil (monomer) soluble initiator, such as t-butyl peroxide and cumene hydroperoxide, or a redox initiator combination, using a reducing agent such as sulfites and bisulfites. To control the molecular weight, conventional regulator substances or chain transfer agents, such as mercaptans, alkanols, and dimeric α-methylstyrene can be used during the polymerization in conventional manner in conventional amounts of from 0.01 to 5.0% by weight, or, preferably, up to 3% by weight, based on the monomers to be polymerized. The polymerization process preferably takes place in the presence of conventional amounts of one or more conventional emulsifier and/or protective colloid, such as, for example, water soluble copolymers having a number average molecular weight of 2000 or more. Suitable emulsifiers include anionic, cationic and nonionic emulsifiers, for example anionic surfactants such as, for example, 8 to 18 carbon alkyl or alkyl aryl ether sulfates, and their salts, and nonionic surfactants, such as, for example, alkyl or alkyl aryl polyglycol ethers. Suitable protective colloids, instead of or in addition to one or more surfactants, may include, for example, polyvinyl alcohols; polysaccharides in water-soluble form, e.g. starches and cellulosics; proteins such as, for example, casein or soy protein; lignin sulfonates; and synthetic copolymers such as, for example, poly(meth)acrylic acid, and copolymers of (meth) acrylates with carboxyl-functional comonomer units.

One or more basic compound may be added before, during or after polymerization in an amount of 0.4 moles or more, preferably from 0.5 to 2 moles, more preferably 0.6 moles or more per mole of carboxylic groups in the copolymer. The basic compound can be added in such an amount to adjust the pH of the aqueous copolymer product to 8.0 or more, or 9.5 or more, or, preferably at least 10.5, and preferably up to 12.5. The basic compound may be an inorganic basic compound, preferably a strong inorganic basic compound, such as an alkali metal hydroxide or an alkaline earth metal hydroxide, such as sodium hydroxide or potassium hydroxide.

The copolymers may comprise the copolymerization product of from 20 to 79.9%, preferably, 30% or more, for example from 60% to 70% by weight, of one or more vinyl aromatic comonomer a), up to 79.9%, preferably 60% or less, for example from 20% to 33% by weight of one or more 1,3 diene comonomer b), from 0.1 to lower than or equal to 2.75%, preferably, 0.5% or more, or, preferably, 2.5% or less, or, more preferably from 1% to 2% by weight of comonomer c), and from 0 to 76%, preferably 40% or less or, more preferably 20% or less, for example from 3% to 7% by weight, of comonomer d), based on the total weight of monomers used to make the copolymer.

The comonomers and their weight proportions are chosen so as to make a copolymer having a glass transition temperature (Tg) of from −20° C. and above, preferably 0° C. or more, or, more preferably, 10° C. and above, or up to or less than 30° C., preferably up to or less than 28° C., or, more preferably up to or less than 25° C. If the Tg is too high for use in cement compositions, end use properties suffer, such as flexibility, especially in cold temperatures, and crack bridging. The Tg of the copolymers can be determined in a known manner by differential scanning calorimetry (DSC). In uses as a sacrificial binder in ceramic processing, the useful Tg of the SB RDP can be as high as 110° C., preferably 60° C.

Suitable comonomers a) include, for example, styrene, alpha-methylstyrene, $C_1$-$C_4$alkyl-styrenes, such as o-vinyltoluene and tert-butylstyrene and $C_1$ to $C_8$ alkyl and cycloalkyl(meth)acrylates. Styrene is preferred. In styrene butadiene copolymers, suitable comonomers b) include, for example, 1,3-butadiene and isoprene, with 1,3-butadiene being preferred. Suitable comonomers c) include, for example, ethylenically unsaturated di-carboxylic acids, their anhydrides, and their salts, particularly itaconic acid and/or maleic acid and/or fumaric acid to improve the dispersibility of the redispersible copolymer powder.

Suitable optional comonomers d) include, for example, alkyl esters of (meth)acrylic acid, such as, for example, ethyl acrylate, methyl methacrylate, n-butyl acrylate, or 2-ethylhexyl(meth)acrylate, ethylenically unsaturated amides and nitriles, such as, for example, (meth)acrylonitrile; diesters of fumaric acid or maleic acid; hydroxy alkyl(meth)acrylates; sulfur acid monomers, such as sodium styrene sulfonate; phosphorus acid monomers, such as phosphoalkyl(meth) acrylates and crosslinking comonomers, such as, for example, divinyl benzene or divinyl adipates; postcrosslinking comonomers, such as acrylamidoglycolic acid (AGA), methyl methylacrylamidoglycolate (MAGME), N-methylol-(meth)acrylamide (NMA) and its alkyl esters; allyl methacrylates or allyl N-methylol carbamates; epoxy-functional comonomers, such as glycidyl(meth)acrylates; and silicon-functional comonomers, such as alkoxysilane containing (meth)acrylates or vinyl monomers.

Preferably, to increase the water redispersibility of the powder obtained upon drying, a basic compound, as described above, can be added prior to substantially drying the aqueous copolymer dispersion.

Preferably, to provide good water redispersibility and odor control, 75% or more, preferably, 85% or more, or, more preferably, 95% or more of the total number of carboxyl groups in the copolymer may be located at the surface of the copolymer powder particles. In such copolymers, some or all of the surface carboxyl groups may be present in their salt form in the copolymer powder. The sum of the molar amount of carboxylic groups located at the surface of the copolymer particles and the molar amount of carboxylic groups in the liquid phase of the aqueous dispersion are separately measurable by known titration methods. The measured molar amount of carboxylic groups located at the surface of the copolymer particles and in the liquid phase of the aqueous dispersion is then divided by the total amount of carboxylic groups in the aqueous dispersion of the copolymer particles, taken as the amount of comonomer(s) c) used to make the copolymer based on the total weight of monomers used to make the copolymer, to calculate the percentage of carboxylic groups that are located at the surface of the copolymer powder. Such copolymers may be made, for example, by the sole use of ethylenically unsaturated dicarboxylic acid(s) as comonomer c), by staged monomer feeding in copolymerization to include more acid in the latter part of copolymerization, and/or by conducting the polymerization at a pH of from 3 to 9, preferably, from 4 to 8, or, preferably 6 to 8.

Preferably, to achieve good water immersion shear strength and freeze/thaw shear strength, the amount of carboxylation is from 0.1% by weight to lower than or equal to 2.75% by weight, preferably from 0.5% by weight to 2.5% by weight, or, more preferably from 1% by weight to 2% by weight, of at least one ethylenically unsaturated dicarboxylic acid, salts thereof, or mixtures thereof, preferably itaconic acid and/or maleic acid and/or fumaric acid, based upon the total comonomer weight or the weight of the water-insoluble film forming polymer, such as a styrene butadiene copolymer with itaconic acid. In accordance with the present invention, the combination of the polymer particle size and total carboxylation level specified together with the high alumina content cement significantly impacts water immersion shear strength and freeze/thaw shear strength.

In accordance with the present invention, the particle size of the water-insoluble film-forming polymer is also important to achieve a given shear strength. The water-insoluble film-forming polymer in the aqueous dispersion or latex which is to be spray dried preferably has an average particle size of from 150 nm to 500 nm, more preferably from 200 nm to 400 nm, most preferably from 220 nm to 350 nm. The aqueous dispersions or latex, which refers generically to a stable dispersion or emulsion of polymer microparticles in an aqueous medium, obtained in the present invention may generally have a solids content of from 30 to 75% by weight, for example between 35% and 65% by weight, preferably from 40 to 60% by weight.

The water redispersible polymer powders of the present invention include a co-dried admixture of a water-insoluble film-forming polymer and a colloidal stabilizer for colloidal stabilization and redispersibility of polymer powders into submicron particle sizes. The use of a low carboxylation, large average particle size water-insoluble film-forming polymer provides a low viscosity for spray drying even at relatively high levels of colloidal stabilizer and high levels of solids in the dispersion subjected to spray drying. Examples of suitable colloidal stabilizers include, for example, polyvinyl alcohols. Preferred polyvinyl alcohols for use herein are partially hydrolyzed polyvinyl alcohols. In embodiments of the invention, the amount of PVOH or other known colloidal stabilizers employed to achieve colloidal stability may be at least 1% by weight, for example from 2% by weight to 30% by weight, preferably from 5% by weight to 20% by weight, based upon the weight of the water-insoluble polymer.

The water-redispersible polymer powder may be produced by drying an aqueous mixture of the water-insoluble film-forming polymer and a colloidal stabilizer to obtain the water-redispersible polymer powder. Preferably, an aqueous dispersion of the water-insoluble film-forming polymer is admixed with the colloidal stabilizer to obtain a substantially homogeneous aqueous dispersion which is then spray dried to obtain the water redispersible polymer powder. In one example, the viscosity of the feed to be spray-dried may be adjusted via the solids content so that a value of less than 1000 mPas (Brookfield viscosity at 20 revolutions and 23° C.), preferably less than 250 mPas, is obtained. The solids content of the dispersion to be spray-dried may generally be from 25% to 60% by weight, preferably from 35% to 50% by weight, based on the total weight of the dispersion. To prepare the water-redispersible polymer powders, the aqueous dispersions are dried, preferably by spray drying. Spray drying can be carried out in customary spray drying plants, with atomization being carried out by means of single-fluid, two-fluid or multifluid nozzles or a rotary disc atomizer. In general, air, nitrogen or nitrogen enriched air may be employed as the drying gas, the inlet temperature of the drying gas generally not exceeding 200° C., preferably from 110° C. to 180° C., more preferably from 140° C. to 170° C. The outlet temperature may generally be from 45° C. to 120° C., preferably from 60° C. to 90° C., depending on the plant, the Tg of the resin and the desired degree of drying.

In addition to the colloidal stabilizer, conventional optional additives in conventional amounts can be added prior to drying the aqueous dispersion, such as an antifoaming agent in an amount of up to 1.5% by weight of antifoamant, based on the weight of the redispersible polymer powder particles. Other additives which may be employed, in conventional amounts, include one or more salts, such as $CaCl_2$, and $MgCl_2$, emulsifiers or surfactants, monosaccharides, disaccharides, and anticaking agents (ACAs) or antiblocking agents such as kaolin, or a dispersant or superplasticizer. The amount of the anticaking agent (ACA) may be up to 30% by weight, preferably from 3% by weight to 15% by weight, based on the total powder quantity.

The X50 size of the particle size distribution of the redispersible polymer powder depends on drying conditions and drying equipment. X50 represents the median diameter in micrometers, which means that 50% by weight of the particles are smaller than this diameter. The redispersible polymer powder of the present invention preferably has an X50 particle size diameter of from 5 to 300 micrometers, preferably from 20 to 200 micrometers, most preferably from 50 to 100 micrometers. The particle size distribution of the powder can be measured by laser diffraction using a particle size analyzer "Sympatec Helos" at a measuring range of 1.8-350 μm and dispersing the powder by compressed air.

The weight of the polymer particles in the redispersible polymer powder, for example, weight of the carboxylated copolymer of vinyl aromatic comonomer and 1,3-diene comonomer described herein in the powder, may preferably be from 40% by weight to 95% by weight, more preferably from 65% by weight to 87% by weight, of the total weight of the water-redispersible polymer powder.

As used herein, the term "redispersible polymer powder" means a powder which may be readily dispersed into deionized water to provide a particle size distribution of the original particle size of the latex or emulsion polymer used to make the redispersible polymer powder.

In accordance with the present invention, examples of cement or hydraulic binders include for example, one or more conventional, commercially available ordinary Portland cements, and one or more conventional, commercially available high alumina content cements such as commercially available calcium aluminate cements (CAC), such as Ternal W, a CAC with an alumina content of approximately 70% by weight, produced by Kerneos SA, France, and calcium sulfoaluminate cements (CSA), such as produced by Tanshan Polar Bear Cement Company, Ltd, Beijing, China.

Calcium sulfate is preferably employed with the calcium aluminate cement in an amount of from 40% by weight to 60% by weight, for example 50% by weight of calcium sulfate, based upon the weight of the calcium aluminate cement. Suitable sources or forms of calcium sulfate include anhydrite or gypsum, setting forms (hemi-hydrate), and drying forms (dihydrate), and mixtures thereof.

In accordance with the present invention, the cement containing dry mix compositions may also include fillers. Examples of fillers include, for example, sand such as silica sand and quartz sand, quartz flour, calcium carbonate, dolomite, aluminum silicates, talc or mica, or light weight fillers such as pumice, foamed glass, aerated concrete, perlites or vermiculites. Mixtures of the fillers may also be included.

The cement containing dry mix composition may include other conventional additives in conventional amounts, such as, for example, alkali metal hydroxide and/or alkaline earth metal hydroxide selected from the group consisting of zinc oxide, zinc hydroxide, and zinc hydroxide carbonate, an accelerator such as lithium carbonate, tartaric acid, one or more thickener such as a cellulose ether, such as hydroxymethylcellulose, a defoamer, and a liquefier, dispersant, or superplasticizer, such as a water soluble co-polymer dispersant, such as MELFLUX 2651F, which is based on modified polycarboxylate technology and produced by BASF Construction Polymers, Kennesaw Ga.

Cement-based tile adhesives of the present invention may generally comprise 25% by weight to 45% by weight, preferably from 30% by weight to 40% by weight of ordinary Portland cement, as the hydraulic binder; 40% by weight to 70% by weight of quartz sand, preferably having a particle size of from 0.1 mm to 0.5 mm, as the main filler, 1% by weight to 8% by weight, preferably 2.5% by weight to 5.5% by weight of calcium aluminate cement, and 0.1% to 10% by weight, preferably 1% to 6% by weight of the redispersible polymer powder according to the present invention, the weight percentages being based upon the total weight of the cement-based tile adhesive dry mix composition, and from 40% by weight to 60% by weight of calcium sulfate, based upon the weight of the calcium aluminate cement. Further optional components include one or more cellulose ethers (preferably in a total amount of 0.05% to 1% by weight, more preferably 0.2% to 0.5% by weight, based on the dry weight of the tile adhesive) to control rheology, water retention, slip resistance and improved workability; quartz or lime stone powder having a particle size of from 30 μm to 60 μm as fine co-filler to improve consistency and workability; and cellulose or mineral fibers to improve the slip resistance. The calcium aluminate cement employed for the CBTA composition may have an alumina ($Al_2O_3$) content of greater than 30% by weight, preferably greater than 40% by weight, more preferably greater than 55% by weight, most preferably at least 70% by weight, based upon the weight of the calcium aluminate cement.

Cementitious grout dry mix compositions of the present invention may generally comprise 25% by weight to 35% by weight of ordinary Portland cement, as the hydraulic binder; 60% by weight to 70% by weight of calcium carbonate, such as Omyacarb 130GU, produced by Omya, Switzerland, as the main filler, 0.5% by weight to 5% by weight of calcium aluminate cement, and 0.1% to 10% by weight, preferably 0.5% to 4% by weight of the redispersible polymer powder according to the present invention, the weight percentages being based upon the total weight of the grout dry mix composition. The calcium aluminate cement employed for the grout composition may have an alumina ($Al_2O_3$) content of greater than 30% by weight, preferably greater than 40% by weight, more preferably greater than 55% by weight, most preferably at least 70% by weight, based upon the weight of the calcium aluminate cement.

Waterproofing membrane or waterproofing mortar dry mix compositions, such as rigid-semi flex mortar formulations, of the present invention may generally comprise 0% by weight to 50% by weight, for example 30% by weight to 50% by weight of ordinary Portland cement, as the hydraulic binder; 30% by weight to 70% by weight of quartz sand as the main filler, 30% by weight to 50% by weight of calcium sulfoaluminate cement, and 0.1% to 10% by weight, preferably 1% to 5% by weight of the redispersible polymer powder according to the present invention, the weight percentages being based upon the total weight of the waterproofing membrane or waterproofing mortar dry mix composition. The calcium sulfoaluminate cement may be a mixture of CSA clinker with an alumina ($Al_2O_3$) content of greater than 30% by weight, gypsum or anhydrite, and fillers such as added limestone. The calcium sulfoaluminate cement may be used without blending ordinary Portland cement.

In another aspect of the present invention, methods of sealing, bonding or coating a substrate comprise (1) providing a cement containing dry mix composition having the re-dispersible polymer powder of the present invention, (2) mixing it with water, and (3) applying to the substrate and drying. The composition is preferably used in products for construction industry and can be used in or to make skim coats, crack isolation membranes, sealing slurries or repair mortars, and self-leveling flooring compounds SLFC. Examples of suitable substrates include, for example, a tile, plywood, backerboard, an insulation panel, interior wall surfaces, steel reinforcement, aged concrete, hardened concrete, aged mortar, hardened mortar, or a soundproofing panel. The consistency of a cement composition is adjusted by the water added to the dry mix powder. The water may be added in such an amount to achieve a desired consistency according to end-use requirements. The inventors have surprisingly found that applying the cement composition in the invention to a substrate results in improved water immersion shear strength and freeze thaw shear strength.

The following examples are provided for illustrative purposes only and are not intended to limit the scope of the claims that follow. Unless otherwise indicated, all parts and percentages are by weight, all temperatures are at room temperature, and all pressures are at standard pressure:

EXAMPLES

Test Methods

Dry Mix Preparation: The cement, sand, polymer, and thickener are weighed and placed into a plastic bag which is then hand mixed for 2 minutes and conditioned for 24 hrs.

Density: Mortars are placed into a container of known volume, tamped down, and then weighed.

Mortar Viscosity: Viscosities are measured with a Brookfield Synchro-lectric viscometer (Model RVT) in combination with a Brookfield Helipath stand at 25° C. The mortar is filled into a density cup and the spindle (T-F) is positioned such that it just touches the surface of the mortar. The spindle of the viscometer rotates for 2 minutes with 5 rpm. During the rotation the viscometer is moved up and down so that its rotating spindle describes a helical path through the sample. The first measurement is not taken until the spindle is fully submerged after one full rotation. Four readings are measured as the viscometer moves in each direction, the average of which is reported.

Set Time: Set time was measured according to ASTM C191. Mortar is placed into the circular set time molds which are then covered with a layer of plastic held in place by a rubber band. These are then placed into position under the Vicat needles. Initial set time and final set time are measured according to the distance the needle can penetrate into the mortar.

Cement Stability of RDP By Mortar Sedimentation: The mortar was dispersed in water in a weight ratio of 10:90 and the sedimentation was followed to characterize cement stability of the redispersible polymer powders. In this method, unstable polymer particles cause agglomeration and the finely dispersed polymer particles disappear resulting in a complete sedimentation which correlates with a poor stabilization of the polymer particles. The sedimentation was characterized by measurement of the turbidity of the cement/polymer—water mixture by following the light transmission after a defined time using a light transmission measurement device, a Spekol 11 (wave length 546 nm) spectrophotometer, calibrated so that 100 transmission is clean water, and 0% is no transmissibility. For the transmission measurements, 5 g of the cement/powder/water mixture (127.2 g cement/7.2 g powder/50.4 g water) as used in the consistency measurements was admixed with 45 g water in a labor glass and stirred with a spatula for 1 minute. After 2 hours, and again after 24 hours a 1 cm cuvette was filled with the upper aqueous phase from the labor glass. The transmission of the cuvette with the aqueous phase was measured with the Spekol 11 (Carl Zeiss Jena) spectrophotometer at a light wavelength of 546 nm. As a control, the sedimentation of a mortar prepared with only cement and water and no redispersible polymer powder was measured and found to be 100% after 2 hours and 100% after 24 hours. The consistencies are measured with a rotating T-Spindel.

Shear Strength: Plywood shear strength was measured according to ANSI 118.4, sections 4.1.1 and 4.1.2. Samples are assembled with a mortar layer bonding one piece of plywood and one piece of quarry tile together. Shear strength is measured after samples are aged for 7 days and 28 days. Impervious ceramic mosaic shear strength was measured according to ANSI 118.4, sections 5.2.2, 5.2.3, and 5.2.4. Samples are assembled with a mortar layer bonding two pieces of impervious ceramic mosaic tile together. Shear strength is also measured after samples are aged (in constant temperature (21° C.-25° C.) and humidity (45-55% relative humidity) conditions) for 7 days (ANSI 118.4, section 5.2.2), 7 days followed by immersion in water for an additional 7 days (ANSI 118.4, section 5.2.3), 28 days (ANSI 118.4, section 5.2.4), and 28 days followed by immersion in water for 6 to 8 hrs followed by 20 cycles of freezing (for a minimum of 12 hrs) and water immersion for 28 day freeze thaw (ANSI 118.4, 5.2.6). These ANSI test standards used for shear strength testing are summarized below:

| Shear Strength Test | ANSI Test Standard |
|---|---|
| Impervious Ceramic Mosaic Tile, 7 day | 118.4, 5.2.2 |
| Impervious Ceramic Mosaic Tile, 7 day water immersion | 118.4, 5.2.3 |
| Impervious Ceramic Mosaic Tile, 28 day | 118.4, 5.2.4 |
| Impervious Ceramic Mosaic Tile, 28 day freeze/thaw | 118.4, 5.2.6 |
| Plywood, 7 day | 118.11, 4.1.1 |
| Plywood, 28 day | 118.11, 4.1.2 |

Compressive Strength and Flexural Strength: Flexural and compressive strength was measured according to EN 12808-3/DIN 13888.

Water Absorption: Water absorption was measured according to EN 12808-5/DIN 13888 and EN1515-18.

Redispersible Polymer Powders (RDPs) Used in Examples

The redispersible polymer powders used in the Examples were prepared using conventional spray drying techniques or were commercially available. The SB RDPs (SB RDP #1, SB RDP #2, SB RDP #3, SB RDP #4, SB RDP #5, DLP 401F, DLP 4141 and DLP 401J) are made by admixing: a water-insoluble film forming carboxylated styrene butadiene (SB) latex which has a copolymerized comonomer content of styrene, butadiene, acrylonitrile, and itaconic acid in an amount which provides a desired carboxylation (e.g. 2.1 parts of itaconic acid provides a carboxylation of 2.1% by weight of itaconic acid, based upon the total comonomer weight), a particle size, and a $T_g$ as indicated in Table 1, and optional anticaking agent (ACA), and optional hydrophobic additive as indicated in Table 1. This mixture may be pumped to a two-fluid nozzle atomizer equipped on a Mobile Minor (GEA Process Engineering Inc, Columbia, Md.) spray dryer. The air pressure to the nozzle may be fixed at 1 bar with 50% flow which is equivalent to 6 kg/hr of airflow. The spray drying may be conducted in an $N_2$ environment with an inlet temperature fixed at 140° C., and the outlet temperature targeted to 50° C.±1° C. by tuning the feed rate of the mixture and spray drying to obtain a redispersible polymer powder with an average particle size as indicated in Table 1.

DLP 2000, is a commercial redispersible polymer powder (a VAE RDP) produced by The Dow Chemical Company, Midland Mich. DLP 2000 comprises a vinylacetate/ethylene copolymer, which is medium hard with an ash content of 10-14% by weight, a $T_g$ of 17° C., a density of 0.375 g/ml to 0.525 g/ml, and a moisture content of less than 2% by weight.

VINNAPAS® 8031 H is a commercial terpolymer powder of ethylene, vinyl laurate and vinyl chloride that is dispersible in water, produced by Wacker Chemie AG, Munich, Germany, with a predominant particle size at redispersion of 0.3-9 μm.

AXILAT PSB 150 is a commercial redispersible polymer powder of styrene-butadiene (SB)/vinylacetate (VA), and versatic vinylester (VeoVA) copolymer produced by Momentive Specialty Chemicals Inc., Roebuck, S.C.

DLP 2141 is a commercial redispersible polymer powder of a blend of vinyl acetate/ethylene polymer and vinyl acetate/VeoVa polymer which is hydrophobically modified, produced by The Dow Chemical Company, Midland Mich.

The DLP 2000, VINNAPAS 8031 H, AXILAT PSB 150, and DLP 2141 are used for comparison with the styrene-butadiene RDPs employed in the present invention. The SB RDPs and their properties (carboxylation or % itaconic acid, average particle size, and $T_g$ of the water-insoluble film-forming polymer) used in the Examples, and the comparative RDPs are shown in Table 1:

TABLE 1

Properties of RDPs Used In The Examples

| RDP | Description | Average Latex polymer particle size (nm) | Carboxylation (wt %) | $T_g$ (° C.) |
|---|---|---|---|---|
| SB RDP #1 | Styrene butadiene, acrylonitrile, itaconic acid copolymer and 3% ACA | 250 | 2.1 | 20 |
| SB RDP #2 | Styrene butadiene, acrylonitrile, itaconic acid copolymer | 250 | 2.5 | 20 |
| SB RDP #3 | Styrene butadiene, acrylonitrile, itaconic acid copolymer | 250 | 1.75 | 20 |
| SB RDP #4 | Styrene butadiene, acrylonitrile, itaconic acid copolymer | 150 | 3 | 8 |
| SB RDP #5 | Styrene butadiene, acrylonitrile, itaconic acid copolymer | 250 | 2.5 | 16 |
| DLP 401F | Styrene butadiene, acrylonitrile, itaconic acid copolymer and 3% ACA | 150 | 3 | 8 |
| DLP 4141 | Styrene butadiene, acrylonitrile, itaconic acid copolymer with 3% ACA and hydrophobically modified | 150 | 3 | 8 |
| DLP 401J | Styrene butadiene, acrylonitrile, itaconic acid copolymer and 1.5% ACA | 250 | 2.1 | 20 |
| DLP 2000 | vinylacetate/ethylene copolymer (VAE) | — | — | 17 |
| VINNAPAS ® 8031 H | ethylene, vinyl laurate and vinyl chloride copolymer | — | — | — |

TABLE 1-continued

Properties of RDPs Used In The Examples

| RDP | Description | Average Latex polymer particle size (nm) | Carboxylation (wt %) | $T_g$ (°C.) |
|---|---|---|---|---|
| AXILAT PSB 150 | styrene-butadiene (SB)/vinylacetate (VA), and versatic vinylester (VeoVA) copolymer | — | — | — |
| DLP 2141 | 1:1 blend of vinyl acetate/ethylene polymer and vinyl acetate/VeoVa polymer hydrophobically modified | — | — | — |

Example 1

Differentiated SB RDP Performance in a NA Cement Tile Adhesive Application—CAC Formulation with 70% Alumina Content The components and their relative amounts (% by weight or parts by weight, pbw) used to prepare cement mortar compositions for cement-based tile adhesive (CBTA) applications using the redispersible powder compositions SB RDP #1 of the present invention and DLP-2000 as a comparison are shown in Table 2, below. The cement mortar compositions were prepared by dry blending the solid components and then adding water indicated. Performance of the cement mortar compositions were tested and the results are shown in Table 3, below.

The results in Table 3, below, indicate that formulations comprising the SB RDPs of the present invention and a low amount of calcium aluminate cement (CAC) exhibit a substantial improvement in set times and 7 day water immersion shear strength at all RDP dosages compared to formulations which contain DLP-2000, a VAE RDP and the same amount of CAC. Thus, as shown in Table 3, formulations comprising the low carboxylation, large particle size vinyl aromatic-diene copolymer containing RDPs of the present invention in combination with low amounts of CAC compared to the amount of ordinary Portland cement, yield surprisingly good water immersion shear strengths and set times.

TABLE 2

Cement Mortar Formulations

| RAW MATERIAL | FORMULA (% BY WEIGHT) | | | | | |
|---|---|---|---|---|---|---|
| | Comp. 1 | EX. 1 | Comp. 2 | EX. 2 | Comp. 3 | Ex. 3 |
| Ordinary Portland Cement Type I | 31 | 31 | 31 | 31 | 31 | 31 |
| Ternal W[1] (Calcium Aluminate Cement) | 4 | 4 | 4 | 4 | 4 | 4 |
| Sand F-80, Silica Sand | 58.38 | 58.38 | 57.38 | 57.38 | 56.38 | 56.38 |
| Lithium Carbonate | 0.1 | 0.1 | 0.1 | 0.1 | 0.1 | 0.1 |
| Tartaric Acid | 0.2 | 0.2 | 0.2 | 0.2 | 0.2 | 0.2 |
| Calcium Sulfate | 2 | 2 | 2 | 2 | 2 | 2 |
| DLP 2000 (VAE RDP) | 4 | | 5 | | 6 | |
| SB RDP #1 (2.1 pts IA, 2500 A) + 3% Melflux 2651 | | 4 | | 5 | | 6 |
| Hydroxyethyl methyl cellulose (HEMC) thickener[2] | 0.32 | 0.32 | 0.32 | 0.32 | 0.32 | 0.32 |
| Total, % weight | 100 | 100 | 100 | 100 | 100 | 100 |
| Water:Powder Ratio by weight | 0.215 | 0.195 | 0.215 | 0.195 | 0.215 | 0.195 |

[1]Ternal ® W cement is a hydraulic binder with an alumina content of approximately 70% by weight, produced by Kerneos SA, Seine France. It is a calcium aluminate cement, and is composed almost entirely of calcium aluminate phases. The usual alumina ($Al_2O_3$) range is 68.7% to 70.5%, with a specification limit of greater than 68.5% by weight, based upon the weight of the Ternal ® W calcium aluminate cement.
[2]WALOCEL MKX 60000 PF01 having a 60000 cps (Haake, 2.55 reciprocal seconds) in a 2 wt % solution in water at room temperature, produced by Dow Chemical, Midland Michigan.

TABLE 3

Properties of Cement Mortar Formulation

| CEMENT TILE ADHESIVE END-USE PROPERTIES | FORMULA | | | | | |
|---|---|---|---|---|---|---|
| | Comp. 1 | EX. 1 | Comp. 2 | EX. 2 | Comp. 3 | Ex. 3 |
| Density (g/ml) | 1.56 | 1.50 | 1.58 | 1.48 | 1.58 | 1.45 |
| Brookfield mortar viscosity 5 RPM (cps) | 517,500 | 576,250 | 543,750 | 565,000 | 486,250 | 487,500 |
| Vicat set time, initial (hrs) | 16.8 | 10.9 | 16.8 | 11.7 | 17.4 | 12.6 |
| Vicat set time, final (hrs) | 19.6 | 16.1 | 21.2 | 19.3 | 21.0 | 19.8 |

TABLE 3-continued

Properties of Cement Mortar Formulation

| CEMENT TILE ADHESIVE END-USE PROPERTIES | FORMULA | | | | | |
|---|---|---|---|---|---|---|
| | Comp. 1 | EX. 1 | Comp. 2 | EX. 2 | Comp. 3 | Ex. 3 |
| Shear Strength, Impervious Ceramic Mosaic Tile: | | | | | | |
| 24 hr (MPa), Average | 0.84 | 1.01 | 0.88 | 1.00 | 0.77 | 0.85 |
| 24 hr (MPa), Standard Deviation | 0.04 | 0.08 | 0.11 | 0.07 | 0.05 | 0.05 |
| 7 day (MPa), Average | 2.38 | 2.43 | 2.46 | 2.39 | 2.30 | 2.51 |
| 7 day (MPa), Standard Deviation | 0.18 | 0.08 | 0.09 | 0.26 | 0.24 | 0.15 |
| 7 day water immersion (MPa), Average | 1.34 | 2.10 | 1.54 | 2.13 | 1.50 | 2.11 |
| 7 day water immersion (MPa), Standard Deviation | 0.08 | 0.15 | 0.15 | 0.27 | 0.13 | 0.21 |
| 28 day (MPa), Average | 2.56 | 2.59 | 2.84 | 2.84 | 2.84 | 2.78 |
| 28 day (MPa), Standard Deviation | 0.11 | 0.17 | 0.19 | 0.09 | 0.23 | 0.12 |
| Shear Strength, Plywood: | | | | | | |
| 7 day (MPa), Average | 0.91 | 0.89 | 1.00 | 1.03 | 1.12 | 1.16 |
| 7 day (MPa), Standard Deviation | 0.15 | 0.18 | 0.11 | 0.09 | 0.12 | 0.20 |
| 28 day (MPa), Average | 0.98 | 0.93 | 1.19 | 1.15 | 1.44 | 1.33 |
| 28 day (MPa), Standard Deviation | 0.06 | 0.14 | 0.11 | 0.13 | 0.12 | 0.27 |

Comparative Example 1

Non-Differentiated SB RDP Performance (Water Immersion Shear Strength) in a NA Cement Tile Adhesive Application—OPC Formulation, 2% RDP with No CAC The components and their relative amounts (% by weight or parts by weight, pbw) used to prepare cement mortar compositions for cement-based tile adhesive (CBTA) applications using the redispersible powder compositions SB RDP #2, #3, #4, and #5 of the present invention and DLP-2000 as a comparison are shown in Table 4 for a 2% by weight RDP level, and in Table 6 for a 6% by weight RDP level, below. The cement mortar compositions only contain an ordinary Portland cement (OPC) and do not include a calcium aluminate cement (CAC). The cement mortar compositions were prepared by dry blending the solid components and then adding water indicated. Performance of the cement mortar compositions were tested and the results are shown in Tables 5 and 7, respectively, below.

The results in Tables 5 and 7, below, indicate that formulations comprising the SB RDPs of the present invention and no calcium aluminate cement (CAC) do not exhibit a significant difference in set times and 7 day water immersion shear strength at both 2% and 6% RDP dosages compared to formulations which contain DLP-2000, a VAE RDP and no CAC. In fact, the set times of these SB RDPs were significantly slower vs DLP 2000, which is the opposite trend observed in a OPC/CAC/calcium sulfate formulation (i.e., Table 3 shows SB RDPs have a faster set time vs DLP 2000). Thus, as shown in Tables 3, 5, and 7, formulations comprising the low carboxylation, large particle size vinyl aromatic-diene copolymer containing RDPs of the present invention in combination with low amounts of CAC yield surprisingly good water immersion shear strengths and set times compared to formulations which do not contain the CAC but do contain an RDP.

TABLE 4

Cement Mortar Formulations (2% RDP)

| | FORMULA (% BY WEIGHT) | | |
|---|---|---|---|
| RAW MATERIAL | Comp. 4 | Comp. 5 | Comp. 6 |
| Ordinary Portland Cement Type I | 35 | 35 | 35 |
| Sand F-80, Silica Sand | 62.66 | 62.66 | 62.66 |
| DLP 2000 (VAE RDP) | 2 | | |
| SB RDP #2 (2.5 pts IA, 250 nm) | | 2 | |
| SB RDP #3 (1.75 pts IA, 250 nm) | | | 2 |
| Hydroxyethyl methyl cellulose (HEMC) thickener | 0.34 | 0.34 | 0.34 |
| Total, % weight | 100 | 100 | 100 |
| Water:Powder Ratio by weight | 0.215 | 0.22 | 0.225 |

TABLE 5

Properties of Cement Mortar Formulation (2% RDP)

| CEMENT TILE ADHESIVE END-USE PROPERTIES | FORMULA | | |
|---|---|---|---|
| | Comp. 4 | Comp. 5 | Comp. 6 |
| Density (g/ml) | 1.46 | 1.51 | 1.48 |
| Brookfield mortar viscosity 5 RPM (cps) | 387500 | 426250 | 393750 |
| Vicat set time, initial (hrs) | 19 | 21 | 20 |
| Vicat set time, final (hrs) | 21 | 22 | 21 |
| Shear Strength, Impervious Ceramic Mosaic Tile: | | | |
| 24 hr (MPa), Average | 0.51 | 0.46 | 0.51 |
| 24 hr (MPa), Standard Deviation | 0.04 | 0.03 | 0.02 |
| 7 day (MPa), Average | 2.35 | 2.14 | 2.05 |
| 7 day (MPa), Standard Deviation | 0.16 | 0.14 | 0.10 |
| 7 day water immersion (MPa), Average | 1.41 | 1.50 | 1.48 |
| 7 day water immersion (MPa), Standard Deviation | 0.13 | 0.16 | 0.18 |
| 28 day (MPa), Average | 2.45 | 2.1 | 2.11 |
| 28 day (MPa), Standard Deviation | 0.17 | 0.08 | 0.12 |
| Shear Strength, Plywood: | | | |
| 7 day (MPa), Average | 0.91 | 0.72 | 0.71 |
| 7 day (MPa), Standard Deviation | 0.14 | 0.07 | 0.10 |
| 28 day (MPa), Average | 1.04 | 0.83 | 0.73 |
| 28 day (MPa), Standard Deviation | 0.21 | 0.17 | 0.13 |

TABLE 6

Cement Mortar Formulations (6% RDP)

| RAW MATERIAL | FORMULA (% BY WEIGHT) | | |
|---|---|---|---|
| | Comp. 7 | Comp. 8 | Comp. 9 |
| Ordinary Portland Cement Type I | 35 | 35 | 35 |
| Sand F-80, Silica Sand | 58.66 | 58.66 | 58.66 |
| DLP 2000 (VAE RDP) | 6 | | |
| SB RDP #5 (2.5 pts IA, 250 nm) | | 6 | |
| SB RDP #4 (3 pts IA, 150 nm) | | | 6 |
| Hydroxyethyl methyl cellulose (HEMC) thickener | 0.34 | 0.34 | 0.34 |
| Total, % weight | 100 | 100 | 100 |
| Water:Powder Ratio by weight | 0.210 | 0.210 | 0.215 |

TABLE 7

Properties of Cement Mortar Formulation (6% RDP)

| CEMENT TILE ADHESIVE END-USE PROPERTIES | FORMULA | | |
|---|---|---|---|
| | Comp. 7 | Comp. 8 | Comp. 9 |
| Density (g/ml) | 1.53 | 1.50 | 1.41 |
| Brookfield mortar viscosity 5 RPM (cps) | 456250 | 503750 | 476250 |
| Vicat set time, initial (hrs) | 21 | 25 | 24 |
| Vicat set time, final (hrs) | 25 | 32 | 31 |
| Shear Strength, Impervious Ceramic Mosaic Tile: | | | |
| 24 hr (MPa), Average | 0.43 | 0.26 | 0.22 |
| 24 hr (MPa), Standard Deviation | 0.03 | 0.01 | 0.01 |
| 7 day (MPa), Average | 3.03 | 2.35 | 2.10 |
| 7 day (MPa), Standard Deviation | 0.16 | 0.13 | 0.14 |
| 7 day water immersion (MPa), Average | 1.55 | 1.49 | 1.34 |
| 7 day water immersion (MPa), Standard Deviation | 0.18 | 0.12 | 0.08 |
| 28 day (MPa), Average | 3.49 | 2.31 | 2.09 |
| 28 day (MPa), Standard Deviation | 0.14 | 0.19 | 0.19 |
| Shear Strength, Plywood: | | | |
| 7 day (MPa), Average | 1.27 | 1.00 | 1.06 |
| 7 day (MPa), Standard Deviation | 0.15 | 0.20 | 0.15 |
| 28 day (MPa), Average | 1.35 | 1.02 | 1.12 |
| 28 day (MPa), Standard Deviation | 0.35 | 0.16 | 0.18 |

Comparative Example 2

Non-differentiated SB RDP Performance (Water Immersion Shear Strength) in a NA Cement Tile Adhesive Application—OPC Formulation, 6% RDP with CAC Having 40% Alumina Content The components and their relative amounts (% by weight or parts by weight, pbw) used to prepare cement mortar compositions for cement-based tile adhesive (CBTA) applications using the redispersible powder compositions SB RDP #1 of the present invention and DLP-2000 as a comparison are shown in Table 8 for a 6% by weight RDP level, below. The cement mortar compositions contain an ordinary Portland cement (OPC) and a calcium aluminate cement (CAC) with only a 40% by weight alumina content, based upon the weight of the CAC. The cement mortar compositions were prepared by dry blending the solid components and then adding water indicated. Performance of the cement mortar compositions were tested and the results are shown in Table 9, below.

The results in Table 9 below, indicate that formulations comprising the SB RDPs of the present invention and a calcium aluminate cement (CAC) with an alumina content of only 40% by weight of the CAC (Ciment FONDU) does not exhibit a significant difference in 7 day water immersion shear strength at a 6% RDP dosage compared to formulations which contain DLP-2000, a VAE RDP and the same CAC having an alumina content of only 40% by weight. However, as shown in Example 1 a dry mix formulation containing a CAC with an alumina content of 70% (Ternal W) did yield significantly differentiated CBTA performance when formulated with OPC, calcium sulfate and SB RDP, indicating unexpectedly superior results obtained with the use of a CAC with an alumina content of greater than 68.5% by weight, based upon the weight of CAC.

TABLE 8

Cement Mortar Formulations (CAC with 40% Alumina Content)

| RAW MATERIAL | FORMULA (% BY WEIGHT) | |
|---|---|---|
| | Comp. 10 | EX. 4 |
| Ordinary Portland Cement Type I | 31 | 31 |
| Ciment FONDU[1] | 4 | 4 |
| Sand F-80, Silica Sand | 56.43 | 56.43 |
| Lithium Carbonate | 0.1 | 0.1 |
| Tartaric Acid | 0.15 | 0.15 |
| Calcium Sulfate | 2 | 2 |
| DLP 2000 (VAE RDP) | 6 | |
| SB RDP #1 (2.1 pts IA, 2500 A) | | 6 |
| Hydroxyethyl methyl cellulose (HEMC) thickener[2] | 0.32 | 0.32 |
| Total, % weight | 100 | 100 |
| Water:Powder Ratio by weight | 0.215 | 0.195 |

[1]Ciment FONDU cement is a hydraulic binder with an alumina content of approximately 40% by weight, produced by Kerneos SA, Seine, France. It is a calcium aluminate cement, and is composed almost entirely of calcium aluminate phases. The specification alumina ($Al_2O_3$) content is ≥37.0% by weight, and the CaO is ≤39.8% by weight, based upon the weight of the Ciment FONDU calcium aluminate cement.
[2]WALOCEL MKX 60000 PF01 having a 60000 cps (Haake, 2.55 reciprocal seconds) in a 2 wt % solution in water at room temperature, produced by Dow Chemical, Midland Michigan.

TABLE 9

Properties of Cement Mortar Formulation (CAC with 40% Alumina Content)

| CEMENT TILE ADHESIVE END-USE PROPERTIES | FORMULA (% BY WEIGHT) | |
|---|---|---|
| | Comp. 10 | EX. 4 |
| Shear Strength, Impervious Ceramic Mosaic Tile: | | |
| 7 day (MPa), Average | 2.34 | 2.31 |
| 7 day (MPa), Standard Deviation | 0.06 | 0.16 |
| 7 day water immersion (MPa), Average | 1.39 | 1.53 |
| 7 day water immersion (MPa), Standard Deviation | 0.07 | 0.07 |

Example 3

Differentiated SB RDP Performance in a APAC Waterproofing Mortar—OPC vs CSA Formulations The components and their relative amounts (% by weight or parts by weight, pbw) used to prepare waterproofing mortar compositions using the redispersible powder compositions DLP 401F and DLP 401J of the present invention and VINNAPAS 8031H and AXILAT PSB 150 as a comparison are shown in Tables 10 and 11 for a 3% by weight RDP level, below. The cement mortar compositions of Table 10 are comparative formulations which contain an ordinary Portland cement (OPC) and no calcium sulfoaluminate cement (CSA). The cement mortar compositions of Table 11 include a calcium sulfoaluminate cement (CSA) in accordance with the present invention. The cement mortar compositions were prepared by dry blending the solid components and then adding water indicated. Performance of the cement mortar compositions were tested and the results are shown in Tables 10 and 11, below. The test methods for waterproofing included: a) 7d adhesion, 28d adhesion, 7d adhesion on wet substrate, water immersion, compressive strength, flexural strength, transverse deformation according Chinese norm "Polymer modified cement slurry for water proof" 2011, and b) flow table according Chinese norm JC/T 958-2005 "flow table for determining mortar fluidity."

The results in Tables 10 and 11 below, indicate that OPC Based Formulations with SB RDPs do not exhibit differentiated performance, and only formulations comprising the SB RDPs of the present invention and a calcium sulfoaluminate cement (CSA) exhibit a significant difference in 7d adhesion, 28d adhesion, and 7d adhesion on wet substrate compared to formulations which contain VINNAPAS 8031 H and AXILAT PSB 150 and the same CSA.

TABLE 10

Ordinary Portland Cement (OPC) Water Proofing Formulations and Performance

| RAW MATERIALS | FORMULA (% BY WEIGHT) | | | |
|---|---|---|---|---|
| | Comp. 11 | Comp. 12 | Comp. 13 | Comp. 14 |
| Ordinary Portland Cement (OPC) PO42.5 | 450 | 450 | 450 | 450 |
| 50-100 mesh sand | 514 | 514 | 514 | 514 |
| HEMC Thickener, MKX 60000 PF01 | 1 | 1 | 1 | 1 |
| DLP 401F SB RDP | 30 | | | |
| DLP 401J SB RDP | | 30 | | |
| VINNAPAS 8031H RDP | | | 30 | |
| AXILAT PSB 150 RDP | | | | 30 |
| P803 defoamer, Munzing Co., Germany | 2 | 2 | 2 | 2 |
| Melment F10, superplasticizer (BASF, Germany) | 3 | 3 | 3 | 3 |
| TOTAL | 1000 | 1000 | 1000 | 1000 |
| Water | 160 | 160 | 160 | 180 |
| Water Proofing Mortar Properties | | | | |
| Flow table (mm) | 135 | 140 | 165 | 135 |
| Wet Density (g/m3) | 2.108 | 2.132 | 2.148 | 2.116 |
| Compression Strength (MPa) | 51.30 | 45.00 | 44.83 | 47.40 |
| Flexural Strength (MPa) | 9.90 | 10.99 | 11.52 | 11.30 |
| 7 d adhesion (MPa) | 1.69 | 1.55 | 1.75 | 0.24 |
| 28 d adhesion (MPa) | 1.91 | 1.64 | 2.13 | 0.51 |
| 7 d adhesion on wet substrate (MPa) | 2.25 | 1.85 | 2.12 | 0.92 |
| Water Immersion (MPa) | 2.16 | 1.88 | 2.31 | 0.57 |
| Transverse Deformation (mm) | 1.60 | 1.40 | 2.30 | 1.20 |

TABLE 11

Calcium Sulfoaluminate Cement (CSA) Water Proofing Formulations and Performance

| RAW MATERIALS | FORMULA (% BY WEIGHT) | | | |
|---|---|---|---|---|
| | EX. 5 | EX. 6 | Comp. 15 | Comp. 16 |
| Calcium Sulfoaluminate Cement, CSA (Tangshan Polar Bear Cement Company, China) | 330 | 330 | 330 | 330 |
| 50-100 mesh sand | 634 | 634 | 634 | 634 |
| HEMC Thickener, MKX 60000 PF01 | 1 | 1 | 1 | 1 |
| P803 defoamer, Munzing Co., Germany | 2 | 2 | 2 | 2 |
| Melment F10, superplasticizer (BASF, Germany) | 3 | 3 | 3 | 3 |
| DLP 401F SB RDP | 30 | | | |
| DLP 401J SB RDP | | 30 | | |
| VINNAPAS 8031H RDP | | | 30 | |
| AXILAT PSB 150 RDP | | | | 30 |
| TOTAL | 1000 | 1000 | 1000 | 1000 |
| Water | 130 | 140 | 150 | 145 |
| Water Proofing Mortar Properties | | | | |
| Flow table (mm) | 155 | 165 | 155 | 162 |
| Wet Density (g/m3) | 2.05 | 1.93 | 1.95 | 2.10 |
| Compression Strength (MPa) | 33.1 | 25.8 | 23.8 | 31.3 |
| Flexural Strength (MPa) | 5.46 | 7.38 | 6.46 | 0.41 |
| 7 d adhesion (MPa) | 1.63 | 1.47 | 1.13 | 1.18 |
| 28 d adhesion (MPa) | 1.63 | 1.46 | 1.10 | 1.12 |
| 7 d adhesion on wet substrate (MPa) | 1.68 | 1.55 | 0.78 | 1.07 |
| Water Immersion (MPa) | 1.37 | 1.14 | 1.29 | 1.37 |
| Transverse Deformation (mm) | 1.30 | 1.40 | 1.90 | 0.70 |

Example 4

Differentiated SB RDP Performance (Flexural and Compressive Strength) in a European Cementitious Grout Formulation CAC-Containing Formulation The components and their relative amounts (% by weight or parts by weight, pbw) used to prepare cementitious grout compositions using the redispersible powder compositions DLP 401F and DLP 401J+10% sodium oleate of the present invention, and DLP 2141 as a comparison, are shown in Table 12 for a 2% by weight RDP level, below. The cement mortar compositions of Table 12 include a calcium aluminate cement (CAC), with a greater than or equal to 68.5% by weight alumina content, based upon the weight of the CAC in accordance with the present invention. The grout compositions were prepared by dry blending the solid components and then adding water indicated. Performance of the grout compositions were tested and the results are shown in Table 12, below. The test methods for the cementitious grouts included: a) flexural and compressive strength according EN 12808-3/DIN 13888, b) water absorption according EN 12808-5/DIN 13888, and c) water absorption according EN 1515-18.

The results in Table 12 below, indicate that ordinary Portland cement (OPC) and calcium aluminate cement (CAC) based grout formulations with SB RDPs of the present invention exhibit a significant difference in flexural and compressive strength, and water absorption compared to formulations which contain DLP 2141 and the same OPC and CAC.

TABLE 12

Calcium Aluminate Cement (CAC) Grout Formulations and Performance

| Raw Materials of Dry Mortar | FORMULA (% BY WEIGHT) | | |
|---|---|---|---|
| Formulation | Comp. 17 | EX. 7 | EX. 8 |
| White cement CEM I 52.5 R (Devnya Cement, Italcementi Group, Bulgaria), an ordinary Portland cement | 30.0 | 30.0 | 30.0 |
| Secar 71 (high alumina cement)[1] | 2.0 | 2.0 | 2.0 |
| Omyacarb 130 GU (calcium carbonate, from Omya AG, Switzerland | 65.90 | 65.90 | 65.90 |
| Walocel MKW 2000 PF 01, hydroxyethyl methyl cellulose, The Dow Chemical Company | 0.10 | 0.10 | 0.10 |
| DLP 2141 | 2.0 | | |
| DLP 401 F | | 2.0 | |
| DLP 401 F + 10% Oleate | | | 2.0 |
| TOTAL | 100.0 | 100.0 | 100.0 |
| Water Solid ratio (%) | 0.25 | 0.25 | 0.25 |
| Grout Properties | | | |
| Slump (mm) | 201 | 201 | 214 |
| Water Absorption After 30 min (g) | 0.42 | 2.29 | 1.12 |
| Water Absorption After 240 min (g) | 0.8 | 5.27 | 1.53 |
| Flexural Strength (N/mm$^2$) | 4.6 | 5.4 | 6.1 |
| Compressive Strength (N/mm$^2$) | 16.8 | 14.5 | 17.7 |

[1]Secar 71 cement is a hydraulic binder with an alumina content of approximately 70% by weight, produced by Kerneos Ltd., Essex, UK, Plant Thurrock. It is a calcium aluminate cement, and is composed mainly of calcium aluminates with no additives and no crystalline silica. The specification range for alumina (Al$_2$O$_3$) is ≥68.5% by weight, with CaO of ≤31.0% by weight, based upon the weight of the Secar 71 calcium aluminate cement.

Example 5

Stability and Consistency of Cement/Powder/Water Mixtures

The stability, as measured by % transmission, consistency, and wet density of each of ordinary Portland cement (OPC), and calcium aluminate cement (CAC) with two styrene butadiene redispersible powders of the prevent invention were determined for: 1) SB RDP #1 (2.1 pts IA, 2500 A)=DLP 401H, and b) SB RDP #4 (3 pts IA, 1500 A)=DLP 401B. The recipe tested for stability and consistency was a mixture of 127.2 g cement+7.2 g RDP powder+50.4 g water. In the stability test with 5 g of the mixture was admixed with 45 g of water. Stability for cement without an RDP powder was used as a control. The stability and consistency results are shown in Table 13:

TABLE 13

Stability and Consistency Of Cement/SB RDP Powder/Water Mixtures

| | Formula | | | | |
|---|---|---|---|---|---|
| Property Stability, Transmission [%] | DLP 401B + OPC | DLP 401B + CAC | DLP 401H + OPC | DLP 401H + CAC | without powder |
| after 2 h | 41 | 4 | 40 | 1 | 100 |
| after 24 h | 97 | 28 | 94 | 10 | 100 |
| Consistency [Pas] | 308 | 282 | 290 | 134 | — |
| Wet density [g/cm$^3$] | 1.62 | 1.62 | 1.72 | 1.69 | — |

We claim:

1. A cement containing dry mix composition comprising:
   a) 25% by weight to 50% by weight of ordinary Portland cement, based upon the weight of the dry mix composition;
   b) a water-redispersible polymer powder (RDP) comprising a carboxylated water-insoluble film-forming styrene-butadiene polymer and a colloidal stabilizer, and
   c) a high alumina content cement, wherein the cement is chosen from
      1) a cement of from 30% by weight to 50% by weight of a calcium sulfoaluminate cement, based on the total weight of the dry mix composition, wherein from 30% by weight to 50% by weight of the dry mix composition comprises ordinary Portland cement, or
      2) a cement of from 2.5% by weight to 5.5% by weight of a calcium aluminate cement, based on the total weight of the dry mix composition, the calcium aluminate cement having an alumina (Al$_2$O$_3$) content of greater than 70% by weight, based upon the weight of the calcium aluminate cement, further wherein from 30% by weight to 40% by weight of the dry mix composition comprises ordinary Portland cement, and the amount of the water redispersible polymer powder is from 1% by weight to 6% by weight, based upon the total weight of the dry mix composition, or
      3) a calcium aluminate cement in an amount of from 0.5% by weight to 5% by weight, based on the total weight of the dry mix composition, said calcium aluminate cement has an alumina (Al$_2$O$_3$) content of greater than 55% by weight, based upon the weight of the calcium aluminate cement, the amount of ordinary Portland cement is from 25% by weight to 35% by weight, based upon the total weight of the dry mix composition, and calcium carbonate is employed in an amount of from 60% by weight to 70% by weight, based upon the total weight of the dry mix composition.

2. A cement composition as claimed in claim 1 wherein the water-insoluble film-forming polymer has an average particle size of from 150 nm to 500 nm and an amount of carboxylation of from 0.1% by weight to 2.75% by weight of at least one ethylenically unsaturated dicarboxylic acid, salts thereof, or mixtures thereof, based on the weight of the water insoluble film forming polymer.

3. A cement composition as claimed in claim 1 which is a cement based tile adhesive dry mix composition wherein the high alumina content cement is the cement 2), further wherein calcium sulfate is employed in an amount of from 40% by weight to 60% by weight, based upon the weight of the calcium aluminate cement.

4. A cement composition as claimed in claim 1 which is a grout dry mix composition wherein the high alumina content cement is the cement 3).

5. A cement composition as claimed in claim 4 which is a grout dry mix composition wherein said calcium aluminate cement has an alumina ($Al_2O_3$) content of greater than 70% by weight, based upon the weight of the calcium aluminate cement, and the amount of the water redispersible polymer powder is from 0.5% by weight to 4% by weight, based upon the total weight of the dry mix composition.

6. A cement composition as claimed in claim 1 which is a waterproofing mortar dry mix composition wherein the high alumina content cement is a calcium sulfoaluminate cement in an amount of from 30% by weight to 50% by weight, based on the total weight of the dry mix composition.

7. A cement composition as claimed in claim 1 wherein the water-insoluble film-forming polymer has an average particle size of from 20 to 400 nm, an amount of carboxylation of from 0.5% by weight to 2.5% by weight, and the ethylenically unsaturated dicarboxylic acid is selected from the group consisting of itaconic acid, maleic acid, fumaric acid and mixtures thereof.

\* \* \* \* \*